US007023517B2

(12) United States Patent
Song et al.

(10) Patent No.: US 7,023,517 B2

(45) Date of Patent: Apr. 4, 2006

(54) IN-PLANE SWITCHING MODE LIQUID CRYSTAL DISPLAY PANEL

(75) Inventors: Hong Sung Song, Gyeongsangbuk-Do (KR); Sung Woong Moon, Gyeongsangbuk-Do (KR); Gun Woo Do, Daegu (KR)

(73) Assignee: LG.Philips LCD Co., Ltd., Seoul (KR)

( * ) Notice: Subject to any disclaimer, the term of this patent is extended or adjusted under 35 U.S.C. 154(b) by 66 days.

(21) Appl. No.: 10/878,113

(22) Filed: Jun. 29, 2004

(65) Prior Publication Data

US 2005/0128417 A1 Jun. 16, 2005

(30) Foreign Application Priority Data

Dec. 16, 2003 (KR) ..................... 10-2003-0092128

(51) Int. Cl.
*G02F 1/13* (2006.01)

(52) U.S. Cl. ...................................... 349/150; 349/141

(58) Field of Classification Search ........ 349/149–150, 349/141

See application file for complete search history.

(56) References Cited

U.S. PATENT DOCUMENTS 6,411,359 B1 * 6/2002 Kobayashi et al. ......... 349/149
6,583,844 B1 * 6/2003 Mishima et al. ............ 349/149
6,822,719 B1 * 11/2004 Song et al. ................. 349/151
6,930,741 B1 * 8/2005 Kimura et al. .............. 349/139

* cited by examiner

*Primary Examiner*—James A. Dudek
(74) *Attorney, Agent, or Firm*—Birch, Stewart, Kolasch & Birch, LLP

(57) ABSTRACT

An in-plane switching mode liquid crystal display panel includes an array substrate; a plurality of gate lines and a plurality of data lines defining a plurality of pixel regions; a switching device; a pixel electrode and a common electrode; a number N of data Tape Carrier Packages (TCPs) applying image information to the data lines and the M number of gate TCPs; a first contact hole formed at an outer edge of the image display part; a first common voltage supply line electrically connected to the common electrode through the first contact hole at a predetermined, e.g., right, end portion; a second contact hole formed at an outer lower end portion of the image display part and electrically connecting the first common voltage supply line and the common electrode; and a color filter. A method of making the display panel is also disclosed.

18 Claims, 4 Drawing Sheets

115 114 113 105 108 117 116 110 104 116' 103 106 130 120 A' 117' 140 130' 140'

IN-PLANE SWITCHING MODE LIQUID CRYSTAL DISPLAY PANEL

BACKGROUND OF THE INVENTION

This Nonprovisional application claims priority under 35 U.S.C §119(a) on Patent Application No. 10-2003-0092128 filed in Korea on Dec. 16, 2003, the entire contents of which are hereby incorporated by reference.

FIELD OF THE INVENTION

The present invention relates to an in-plane switching mode liquid crystal display panel capable of improving the picture quality of a panel by strengthening the electric connection of a common electrode.

DESCRIPTION OF THE RELATED ART

A display as a virtual information transfer medium is increasing in importance in the current Information Age, and in order to gain a better position in a pertinent field, the display should meet requirements of thinness, lightweight and high picture quality.

Presently, liquid crystal displays (LCDs), a major product of flat panel displays (FPDs), are available for mass production and satisfy the aforementioned display conditions, so various products are being manufactured employing LCDs, and as such, LCD devices are acknowledged as core parts that can gradually replace existing CRTs.

An LCD is a display using optical anisotropy and polarizability of a liquid crystal material, in which alignment of liquid crystal molecules are controlled by artificially applying electric field to a liquid crystal layer, to thereby display image information.

For this purpose, the liquid crystal display device includes a liquid crystal display panel having a driving circuit unit, a backlight unit installed at a lower portion of the liquid crystal display panel to transmit light to the liquid crystal display panel, a mold frame supporting the backlight unit and the liquid crystal display panel, and a case.

A liquid crystal display panel is constructed including an array substrate with a switching device, such as a thin film transistor (TFT), formed thereon, a color filter substrate, and a liquid crystal layer formed between the array substrate and the color filter substrate.

A driving circuit unit includes a gate driver integrated circuit (IC) for sequentially applying scan signals to gate lines at every frame, a data driver integrated circuit (IC) for applying image information to pixels through data lines corresponding to scan signals of the gate driver IC, a timing controller for controlling the data driver IC and the gate driver IC, and a power supply unit for supplying various driving voltages used in the liquid crystal display device.

A general method for connecting the driving circuit unit to the liquid crystal display panel includes a TAB (Tape Automated Bonding) method and a COG (Chip On Glass) method. The TAB method employs a driving circuit mounted on a thin flexible film made of a polymer material, that is, a tape carrier package (TCP), and the flexible film is connected to the liquid crystal display panel, thereby connecting the driving circuit unit to the liquid crystal panel. In the COG method, the driving circuit unit is directly mounted and connected on a glass substrate of the liquid crystal display panel by using a bump.

In a TAB type liquid crystal display panel, the driving circuit mounted on the TCP receives a control signal and voltages from outside through a signal line mounted on a printed circuit board (PCB) connected to the TCP.

In a COB type liquid crystal display panel, the driving circuit mounted on the liquid crystal display panel is connected to a signal line according to a line-on-glass (LOG) method formed on the liquid crystal display panel, namely, an array substrate itself, and receives a control signal and a driving voltage from a timing controller and a power supply unit.

Recently, it has become known that TAB type liquid crystal display panel can be made thin by mounting signal lines according to the LOG method. For example, one does not have to install a gate printed circuit board by forming signal lines connected to the gate driver IC, thereby requiring relatively fewer signal lines on a panel according to the LOG method.

A liquid crystal display panel constructed as described above will now be described in detail with reference to the accompanying drawings.

FIG. 1 is a general plan view showing an array substrate of a related liquid crystal display panel, in which signal lines are mounted according to the LOG method.

The liquid crystal display panel permits an in-plane switching (IPS) mode by having a pair of electrodes, namely, a pixel electrode and a common electrode formed on the array substrate. The liquid crystal display panel is a wide viewing angle liquid crystal display panel in which liquid crystal molecules are driven in a direction horizontal to a substrate by using the pair of electrodes to thereby improve a viewing angle to 170° or larger.

As shown in FIG. 1, an array substrate 10 can be divided into an image display part 20 for displaying an image and an image non-display part (namely, an outer edge of the image display part 20) where a portion of the driving circuit unit for driving the liquid crystal display panel is positioned.

Though not shown, a plurality of gate lines and a plurality of data lines are formed horizontally and vertically on the substrate 10 on the image display part 20, defining a plurality of pixel regions, and a thin film transistor (TFT), the switching device, is formed at each pixel region.

The image non-display part includes a plurality of data TCPs (Tape Carrier Packages) 14 connecting a data pad part 5 of the array substrate 10 and a data printed circuit board 15, a plurality of gate TCPs 4 connected to a gate pad part 6, a data driver IC 13 individually mounted on the data TCP 14, and a gate drive IC 3 individually mounted on the gate TCP 4.

Despite not having a gate PCB, the gate TCP (Tape Carrier Package) 4 receives various control signals and driving voltages through a line-on-glass signal line 16 connected to the data TCP 14.

A common electrode 8 corresponding to the pixel electrode is formed on the array substrate 10 to apply a horizontal electric field to liquid crystal molecules of the liquid crystal display panel. Though not shown, a common electrode 8 is patterned at each pixel region of the image display part 20 and disposed alternately with the pixel electrode.

The common electrode 8 is electrically connected to signal lines 17 and 17' of the data TCP 14 and the gate TCP 4 of the driving circuit unit to receive a common voltage from a power supply unit (not shown). Namely, the common electrode 8 is electrically connected to the signal line 17 of the first and last data TCPs 14 and the signal line 17' of the last gate TCP 4 through contact holes 40 formed at four corners of the common electrode 8, and electrically connected to common voltage supply lines 30 and 30' respectively connected to the signal lines 17 and 17' of the last data TCP 14 and the last gate TCP 4, to thereby receive a common voltage.

The common electrode 8, which receives a common voltage signal by being connected to the signal lines 17 and 17' and the common voltage supply lines 30 and 30', is used to form an equivalent electric field through the entire panel in order to improve picture quality.

However, a voltage drop phenomenon due to a resistance component of the common electrode 8 and of the common voltage supply lines 30 and 30' occurs between a pixel region adjacent to the data pad part to which the common voltage signal is first applied and a pixel region positioned at the end of the common voltage supply lines 30 and 30' to which the signal is finally applied. As a result, the common voltage is changed as it goes from the data pad part to the right end portion (A) of the liquid crystal display panel, causing a considerable signal distortion.

This is due to the fact that the electric connection between the common electrode 8 of the right end portion (8) and the common voltage supply lines 30 and 30' is so weak.

FIG. 2 is a plan view showing an enlarged view of the portion (A) of the liquid crystal display panel of FIG. 1.

As shown in FIG. 2, at the right end portion (A) of the array substrate 10, the common electrode 8 is electrically connected to the common voltage supply lines 30 and 30' through one contact hole 40 formed at the corner of the common electrode 8.

A data line number display part 50 is formed between the image display part 20 and the common voltage supply line 30' of the lower portion of the panel. The data line number display part 50 is formed in an embossed form by using the same metal material as the common voltage supply lines 30 and 30'.

The common electrode 8 is made of a transparent conductive material such as ITO (Indium-Tin-Oxide) having a relatively high resistance, and especially, the common electrode 8 at the lower end portion is weak in its electric connection, so that a great signal distortion is generated according to the change in the common voltage. As a result, an effective voltage of the actual pixel part is changed, causing an image defect such as a flicker or a cross talk.

SUMMARY OF THE INVENTION

Therefore, an object of the present invention is to provide an in-plane switching mode liquid crystal display panel capable of improving a picture quality by strengthening the connection between a common electrode and a common voltage supply line to stabilize a common voltage.

To achieve these and other advantages and in accordance with the purpose of the present invention, as embodied and broadly described herein, there is provided an in-plane switching mode liquid crystal display panel including: an array substrate divided into an image display part and an image non-display part; a plurality of gate lines and a plurality of data lines vertically and horizontally arranged on the array substrate and defining a plurality of pixel regions on the image display part; a switching device formed at the pixel region; a pixel electrode and a common electrode disposed alternately at the pixel region and generating a horizontal electric field; a number N of data TCPs (Tape Carrier Packages) positioned at the image non-display part of the array substrate and image information applied to the data lines and the M number of gate TCPs (Tape Carrier Packages) for sequentially applying scan signals to the gate lines; a plurality of signal lines provided for receiving various control signals or voltage signals from the data TCP or the gate TCP; a first contact hole formed at an outer edge of the image display part and electrically connecting a signal line of the data TCP or the gate TCP with a common electrode; a first common voltage supply line connected to a signal line of the Mth gate TCP and electrically connected to the common electrode through the first contact hole at a right end portion; a second contact hole formed at an outer lower end portion of the image display part and electrically connecting the first common voltage supply line and the common electrode; and a color filter substrate corresponding to and attached to the array substrate.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this disclosure, illustrate embodiments of the invention and together with the description serve to explain the principles of the invention.

In the drawings.

DETAILED DESCRIPTION OF THE PREFERRED EMBODIMENTS

Figure 1:
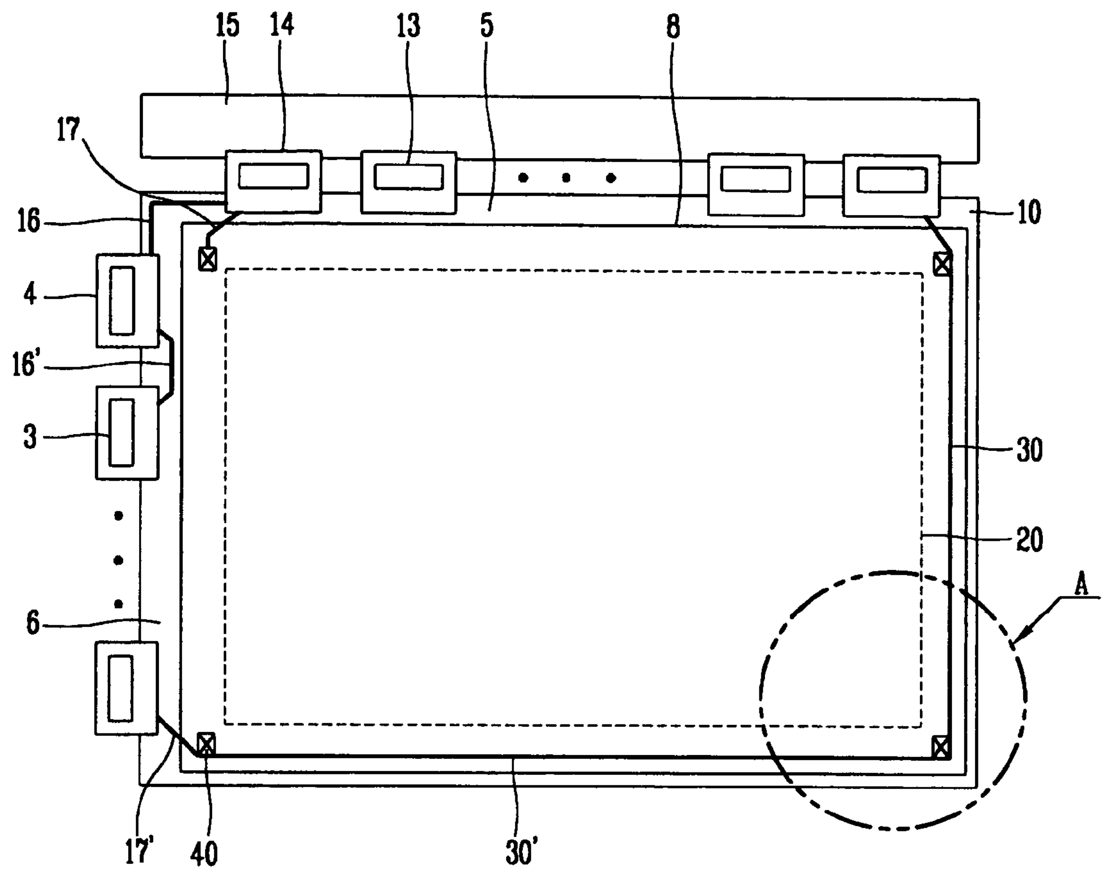
FIG. 1 is a plan view showing an array substrate of a general in-plane switching mode liquid crystal display panel.
Figure 2:
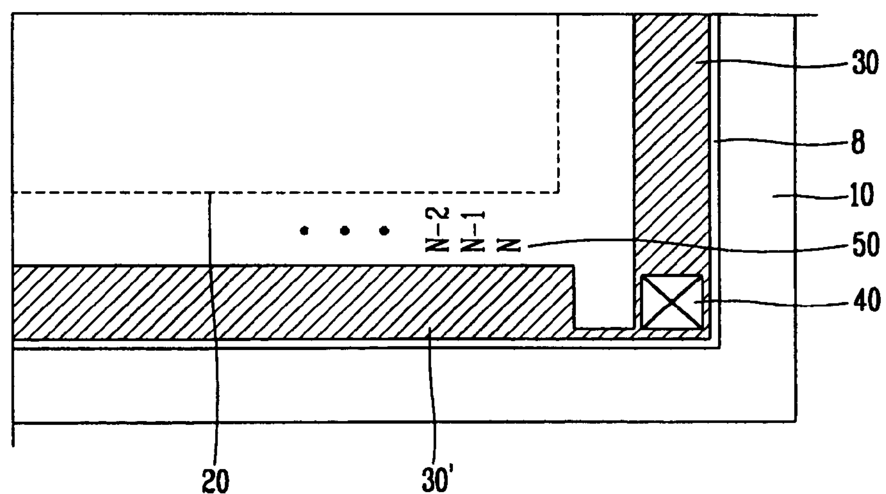
FIG. 2 is an enlarged plan view of a portion 'A' of the liquid crystal display panel of FIG. 1.

Reference will now be made in detail to the preferred embodiments of the present invention, examples of which are illustrated in the accompanying drawings.

A general liquid crystal display panel includes a normally white mode using twisted nematic liquid crystal material.

In the twisted nematic mode liquid crystal display panel, a pair of horizontal alignment films are aligned by rubbing in a direction so that they are mutually orthogonal. Namely, in the twisted nematic mode, alignment directions of alignment films formed on an array substrate and a color filter substrate intersect each other, so that, for example, they are symmetrical on the basis of the gate line.

One twisted nematic mode liquid crystal display panel problem is that a change of a contrast ratio and luminance according to a viewing angle is too severe to implement a wide viewing angle. This results from a refractive anisotropy of liquid crystal molecules, that is, when a voltage is applied to the liquid crystal display panel, liquid crystal molecules aligned horizontally to the substrate are aligned nearly vertical to the substrate.

Research actively conducted on the in-plane switching mode liquid crystal display panel improves the viewing angle by 170° or larger by driving liquid crystal molecules in a horizontal direction to the substrate.

The array substrate of the in-plane switching mode liquid crystal display panel includes gate lines and data lines vertically and horizontally arranged on the substrate and defining pixel regions, and a TFT, a switching device, formed at the intersection of the gate line and the data line, like in the general twisted mode.

A common electrode and a pixel electrode are alternately disposed in the pixel region to generate a horizontal electric field.

A common electrode and a pixel electrode are arranged in a bent structure (or herringbone structure), making a multi domain structure with symmetry, so that abnormal lights due to double refraction characteristics of liquid crystal are offset to thereby minimize a color shift phenomenon. Accordingly, at least two domains which have the same size but the opposite directions are formed in the same pixel region, so that double refraction of liquid crystals is compensated and thus viewing angle characteristics of the liquid crystal display panel are improved.

A common electrode receives a common voltage from a power supply unit of a driving circuit unit. In the related art, the common electrode itself has a relatively high resistance value compared to metal, and especially, an electric connection is weak at the common electrode of the lower end portion, causing a defective image such as a flicker or cross talk.

The present invention provides an in-plane switching mode liquid crystal display panel in which an electric connection of a common electrode of a lower end portion is strengthened to stabilize a common voltage to thereby prevent a defective image due to signal distortion.

Strengthening of the electric connection of the common electrode of the lower end portion can be achieved by forming a plurality of contact holes for connection with a common voltage supply line at a lower end portion of the panel or extendedly forming the common voltage supply line to an image display part.

An in-plane switching mode liquid crystal display panel in accordance with an exemplary embodiment of the present invention will now be described with reference to the accompanying drawings.

Figure 3:
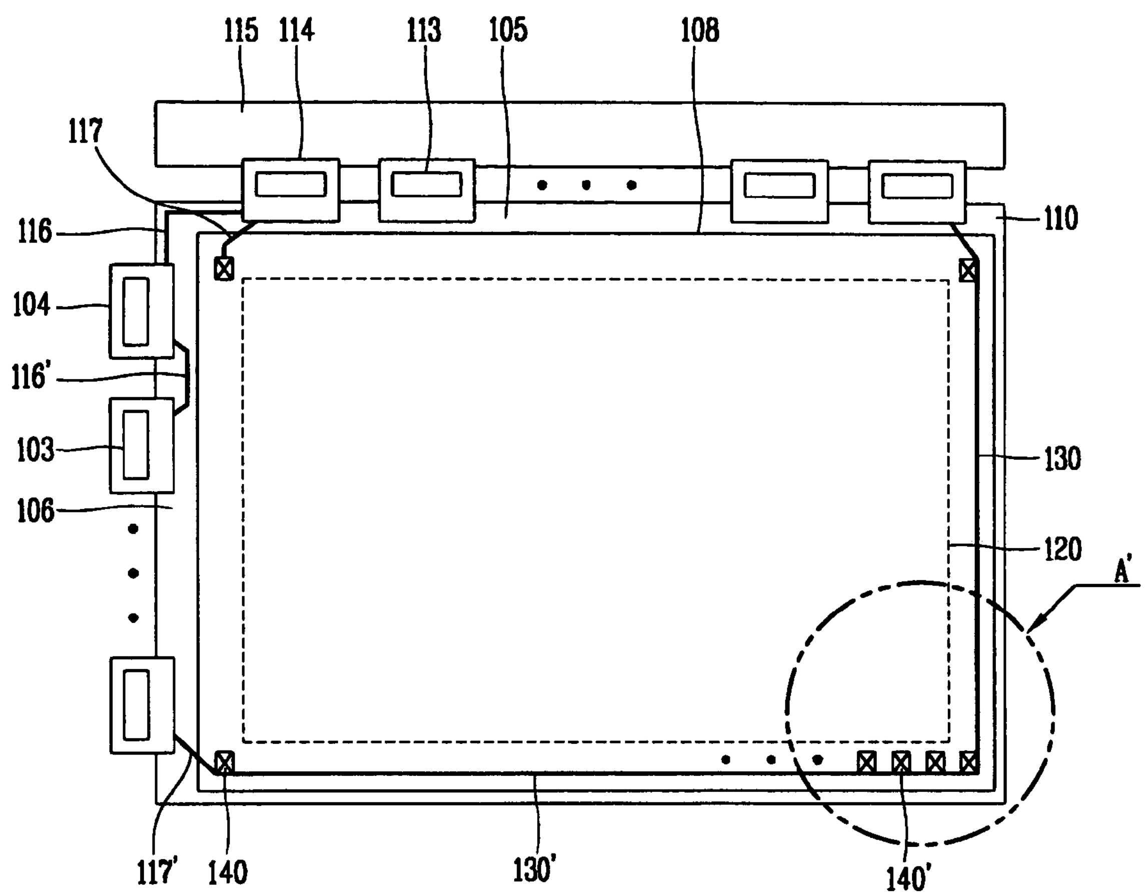
FIG. 3 is a plan view showing an array substrate of an in-plane switching mode liquid crystal display panel in accordance with a first exemplary embodiment of the present invention.

FIG. 3 is a plan view showing an array substrate of an in-plane switching mode liquid crystal display panel in accordance with a first exemplary embodiment of the present invention.

FIG. 3 shows an example of a liquid crystal display panel with a signal line mounted according to a line-on-glass method, but the present invention is not limited thereto.

The liquid crystal display panel has such an in-plane switching mode that a pair of electrodes, namely, the pixel electrode and the common electrode, are formed on the array substrate. The liquid crystal display panel is a wide viewing angle liquid crystal display panel having an improved viewing angle of 170° or wider by driving liquid crystal molecules in a direction horizontal to the substrate by using a pair of electrodes.

As illustrated, an array substrate 110 can be divided into an image display part 120 for displaying an image and an image non-display part (namely, an outer edge of the image display part 120) where a portion of a driving circuit unit for driving the liquid crystal display panel is positioned.

In other words, one longer side and one shorter side of the array substrate 110 are extended compared to a color filter substrate (not shown), where the driving circuit unit for driving the liquid crystal display panel is positioned. A gate pad part 106 is positioned at the protruded shorter side of the array substrate 110 and a data pad part 105 is positioned at the extended longer side of the array substrate 110.

Though not shown, a plurality of gate lines and a plurality of data lines are arranged vertically and horizontally on the substrate 110, defining a plurality of pixel regions. A switching device, e.g., a TFT (Thin Film Transistor), is formed at each pixel region.

The image non-display part includes a plurality of data TCPs (Tape Carrier Packages) 114 connecting a data pad part 105 of the array substrate 110 and the data printed circuit board 115, a plurality of gate TCPs 104 connected to a gate pad part 106, a data driver IC 113 individually mounted on the data TCP 114, and a gate drive IC 103 individually mounted on the gate TCP 104.

An exemplary method for driving the liquid crystal display panel by the driving circuit unit constructed as described above will now be described.

First, the data driver IC 113 is mounted on the data TCP 114 and a TCP input line (not shown) and a TCP output line (not shown) are formed to be electrically connected to the data driver IC 113.

The TCP input line of the data TCP 114 is electrically connected to an output line (not shown) of the printed circuit board 115, and the TCP output line of the data TCP 114 is electrically connected to a link line (not shown) of the pad part 105. As an example, a first data TCP 114 additionally includes a TCP supply line (not shown) electrically connected to a line-on-glass (LOG) signal line 116 of the array substrate 110.

The TCP supply line applies a gate drive signal of a timing controller and a power supply unit received by way of the data printed circuit board 115 to the LOG signal line 116.

The data driver IC 113 converts image information which has been received in a digital form into analog type image information and applies it to the data line of the liquid crystal display panel.

The gate driver IC 103 is mounted on the gate driver IC 103, and the gate driver IC 103 is electrically connected to the TCP supply line and the TCP output line. The gate driver IC 103 receives various control signals through the TCP supply line and applies an output signal to the TCP output line. The gate driver IC 103 sequentially applies scan signals to the gate line in response to an inputted control signal. At this time, the gate driver IC 103 supplies low potential scan signals to the gate lines during another period than a period during which it supplies high potential scan signals.

The LOG signal lines 116 and 116' apply voltage signals, such as a high potential scan signal, a low potential scan signal, a common voltage signal, a ground signal and a power voltage signal, received from the power supply unit, and gate control signals, such as a gate start pulse (GSP), a gate shift clock (GSC), a gate output enable (GOE) signal, supplied from the timing controller.

The timing controller controls driving time of the gate driver IC 103 and the data driver IC 113, and supplies image information to the data driver IC 113.

The power supply unit generates and supplies driving voltages, such as the common voltage, the high potential scan signal and the low potential scan signal, for a liquid crystal display device by using input power.

The gate driver IC 103 sequentially applies scan signals to the gate lines by frame units. At this time, switching devices of which gate electrodes are electrically connected to the scan signal-applied gate lines are turned on, and the image information supplied to the data lines from the data driver IC 113 is applied to pixels through the switching devices which have been turned on by the scan signals. Accordingly, light transmittance is controlled by driving the liquid crystal material by an electric field applied between the pixel electrode and the common electrode 108, thereby displaying an image.

The array substrate 110 includes the pixel electrode and the corresponding common electrode 108 formed thereon to apply a horizontal electric field to the liquid crystal molecules. Though not shown, the common electrode 108 is patterned and alternately disposed with the pixel electrode at each pixel region of the image display part 120.

The common electrode 108 is electrically connected to the data TCP 114 and the gate TCP 104 of the driving circuit unit and receives a common voltage from the power supply unit (not shown).

In other words, the common electrode 108 is electrically connected to the signal line 117 of the first and last data TCPs 114 and the signal line 117' of the last gate TCP 104 through contact holes 140 formed at four corners of the common electrode 108, and electrically connected to common voltage supply lines 130 and 130' respectively connected to the signal lines 117 and 117' of the last data TCP 114 and the last gate TCP 104, to thereby receive a common voltage.

A plurality of contact holes 140' are formed at the common voltage supply line 130' of the lower end portion for the purpose of strengthening electrical connection of the common electrode 108 of the lower end portion, through which the common electrode 108 and the common voltage supply line 130' are electrically connected. Because the contact surface between the common electrode 108 and the common voltage supply line 130' is widened through the plurality of contact holes 140', electrical connection between the common electrode 108 and the common voltage supply line 130' can be strengthened.

Though not shown, the common voltage supply line 130 connected to the data TCP 114 is electrically connected to a storage line formed in each pixel region to form a storage capacitor at each pixel region.

In other words, in case of forming the storage capacitor by a storage-on-common method, a common voltage applied to the common electrode 108 is equally received from the common electrode supply line 130, thereby forming the storage capacitor.

Since the common electrode 108 receives the common voltage signal from the link lines 117 and 117' and the common voltage supply lines 130 and 130' through the plurality of contact holes 140 and 140', an equivalent electric field can be formed through the entire panel.

The electrical connection-strengthened common electrode 108 of the lower end portion (A') of the panel will now be described in detail with reference to FIG. 4.

Figure 4:
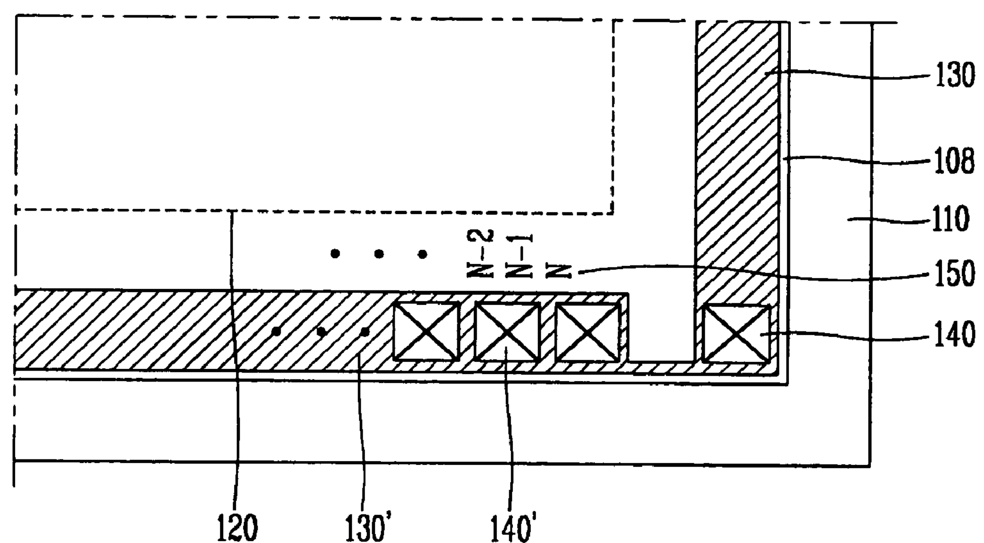
FIG. 4 is an exploded plan view showing a portion 'A'' of a liquid crystal display panel of FIG. 3.

FIG. 4 is an exploded plan view showing a portion (A') of a liquid crystal display panel of FIG. 3.

As shown in FIG. 3, at a right end portion of the array substrate 110, the common electrode 108 is electrically connected to the common voltage supply line 130 connected to the data TCP 114 through one contact hole 140 positioned at the corner of the common electrode 108, and also electrically connected to the common voltage supply line 130' connected to the gate TCP 104 through the plurality of contact holes 140' positioned at the common electrode 108 of the lower end portion.

Namely, the problem of connection of the common electrode of the lower end portion of the conventional panel is solved such that the plurality of contact holes 140' are formed on the common voltage supply line 130' of the lower end portion and electrically connected to the common electrode 108 of the upper portion, whereby the contact surface between the common electrode 108 and the common voltage supply lines 130 and 130' can be enlarged, and thus, a stable common voltage signal according to reduction in resistance can be obtained.

Meanwhile, a data line number display part 150 is formed between the image display part 120 and the common voltage supply line 130' of the lower portion of the panel. The data line number display part 150 is formed in an embossed form by using the same metal material as the common voltage supply lines 130 and 130' and indicates addresses of the data lines to facilitate panel designing by a designer and is designed to facilitate measuring a resistance of the data line or checking a defect.

A different exemplary embodiment in which the common voltage supply line of the lower end portion is extended to include the data line number display part to thereby further strengthen the electrical connection with the common electrode will now be described.

Figure 5:
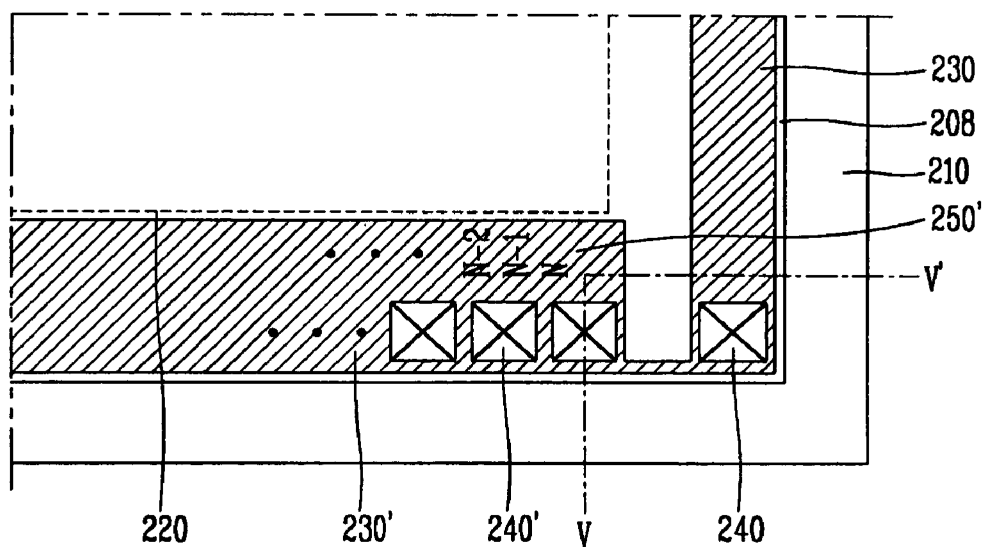
FIG. 5 is an exploded plan view showing a portion of an array substrate of the in-plane liquid crystal display panel in accordance with a second exemplary embodiment of the present invention.

FIG. 5 is an exploded plan view showing a right portion of the array substrate of the in-plane liquid crystal display panel in accordance with a second exemplary embodiment of the present invention.

As shown in FIG. 5, at the right lower end portion of the array substrate 210, a common electrode 208 is electrically connected to a common voltage supply line 230 connected to a data TCP (not shown) through one contact hole 240 positioned at a corner of the common electrode 208, and also electrically connected to a common voltage supply line 230' connected to a gate TCP (not shown) through a plurality of contact holes 240' positioned at the common electrode 208 of the lower end portion.

The common voltage supply line 230' of the lower end portion is formed extended to the image display part 220 to include a data line number display part 250'.

The data line number display part 250' is formed at an upper side of the common voltage supply line 230', namely, between the image display part 220 and the contact hole 240' of the lower portion of the panel. The data line number display part 250' is formed in an intagliated form with the same metal material as the common voltage supply lines 230 and 230'.

In this manner, in this embodiment of the present invention, the common voltage supply line 230' of the lower end portion electrically connected to the common electrode 208 is formed wide, so that a stable common voltage signal can be supplied according to reduction in resistance of the common voltage supply line 230' itself.

A process of fabricating the array substrate 10 constructed as described above will now be described on the basis of the common voltage supply lines 230 and 230'.

Figure 6A:
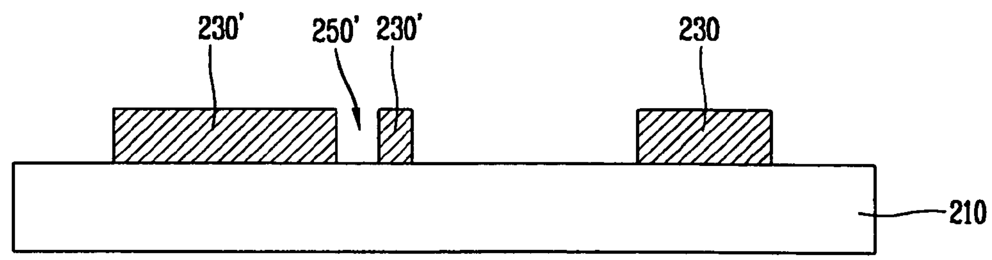
FIGS. 6A to 6C are sequential sectional view showing a fabrication process according to V–V' of the liquid crystal display panel of FIG. 5.
Figure 6B:
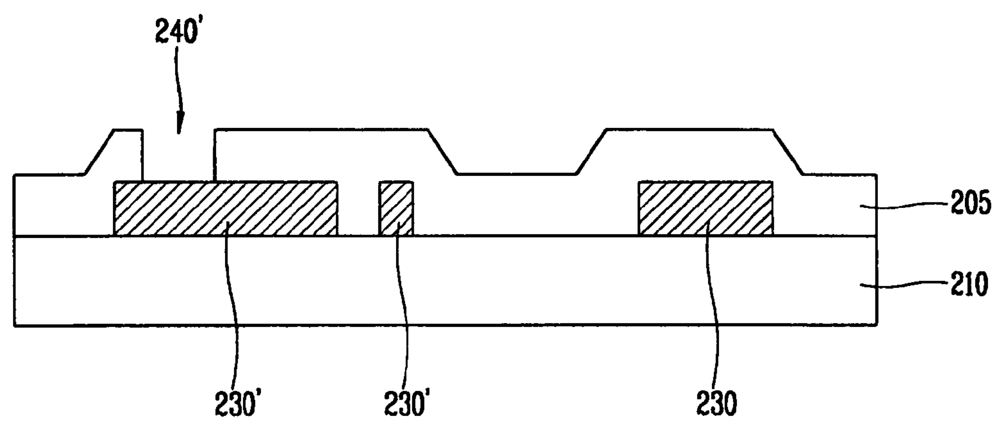
Figure 6C:
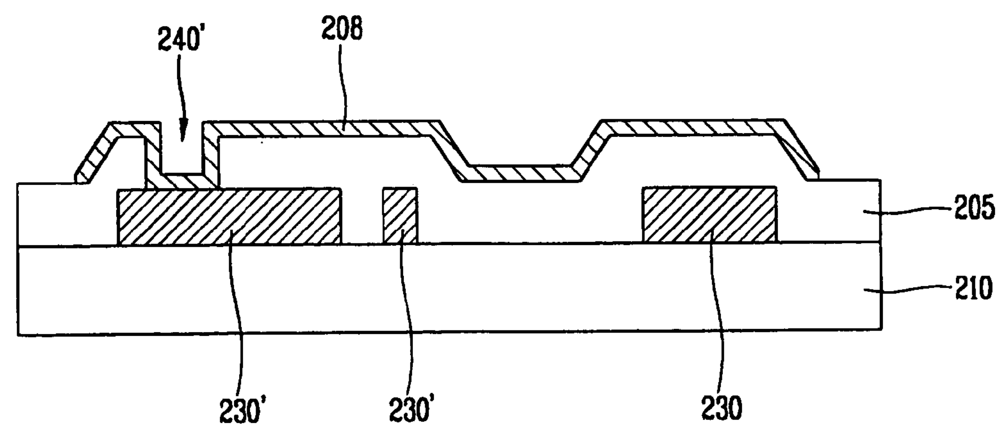

FIGS. 6A to 6C are sequential sectional view showing a fabrication process according to V–V' of the liquid crystal display panel of FIG. 5.

First as shown in FIG. 6A, the common voltage supply lines 230 and 230' for supplying a common voltage signal to the common electrode 208 are formed on the substrate 210 made of a transparent insulation material such as glass.

The common voltage supply lines 230 and 230' can be formed by patterning a gate metallic material when a gate line (not shown) is formed at the image display part of the substrate 210, and especially, the intagliated data line number display part 250' is formed at the portion of the common voltage supply line 230' of the lower end portion.

Next, as shown in FIG. 6B, an insulation film 205 is deposited at the entire surface of the substrate 210 with the common voltage supply liens 230 and 230' formed thereon.

At this time, the contact hole 240' is formed exposing a portion of the common voltage supply line 230' of the lower end portion including the data line number display part 250', through which electrical connection between the common electrode 208 and the common voltage supply line 230' can be strengthened.

And then, as shown in FIG. 6C, the common electrode 208 electrically connected to the common voltage supply line 230' through the contact hole 240' is formed on the insulation film 205.

The common electrode 208 is formed by depositing a transparent conductive material, such as ITO (Indium-Tin-Oxide), IZO (Indium-Zinc-Oxide) or ITZO (Indium-Tin-Zinc-Oxide), and patterning it through a photolithography process.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. An in-plane switching mode liquid crystal display panel, comprising:

an array substrate divided into an image display part and an image non-display part;

a plurality of gate lines and a plurality of data lines vertically and horizontally arranged on the array substrate and defining a plurality of pixel regions on the image display part;

a switching device formed at the pixel region;

a pixel electrode and a common electrode disposed alternately at the pixel region and generating a horizontal electric field;

a N number of data Tape Carrier Packages positioned at the image non-display part of the array substrate for applying image information to the data lines and the M number of gate Tape Carrier Packages for sequentially applying scan signals to the gate lines;

a plurality of signal lines for receiving various control signals or voltage signals from the data Tape Carrier Packages or the gate Tape Carrier Package;

a first contact hole formed at an outer edge of the image display part and electrically connecting a signal line of the data TCP or the gate TCP with a common electrode;

a first common voltage supply line connected to a signal line of the Mth gate TCP and electrically connected to the common electrode through the first contact hole at a predetermined end portion;

a second contact hole formed at an outer lower end portion of the image display part and electrically connected to the first common voltage supply line and the common electrode; and a color filter substrate corresponding to and attached to the array substrate.

2. The panel of claim 1, further comprising:

a data line number display part formed between the image display part and the first common voltage supply line.

3. The panel of claim 2, wherein the first common voltage supply line extends to the image display part of the array substrate to include the data line number display part.

4. The panel of claim 3, wherein the data line number display part is formed in an intagliated form by patterning a gate metallic material.

5. The panel of claim 1, further comprising:

a second common voltage supply line electrically connected to the common electrode through the first contact hole of the predetermined lower end portion by being connected to a signal line of the Nth data Tape Carrier Package.

6. The panel of claim 1, wherein the signal line electrically connected to the common electrode receives the common voltage from the data Tape Carrier Package or from the gate Tape Carrier Package.

7. The panel of claim 1, wherein the pixel electrode and the common electrode are made of ITO (Indium-Tin-Oxide), IZO (Indium-Zinc-Oxide) or ITZO (Indium-Tin-Zinc-Oxide).

8. The panel of claim 1, wherein the second contact hole is located on the first common voltage supply line along the first common voltage supply line.

9. The panel of claim 1, wherein the first and second common voltage supply lines are located in the gate line direction and in the data line direction, respectively, in the form of a patterned a gate metallic material.

10. A method of making an in-plane switching mode liquid crystal display panel, comprising:

dividing an array substrate into an image display part and an image non-display part;

arranging a plurality of gate lines and a plurality of data lines vertically and horizontally on the array substrate and defining a plurality of pixel regions on the image display part;

forming a switching device at the pixel region;

disposing a pixel electrode and a common electrode alternately at the pixel region and generating a horizontal electric field;

positioning a N number of data Tape Carrier Packages positioned at the image non-display part of the array substrate for applying image information to the data lines and the M number of gate Tape Carrier Packages for sequentially applying scan signals to the gate lines;

providing a plurality of signal lines for receiving various control signals or voltage signals from the data Tape Carrier Packages or the gate Tape Carrier Package;

forming a first contact hole at an outer edge of the image display part and electrically connecting a signal line of the data TCP or the gate TCP with a common electrode;

connecting a first common voltage supply line to a signal line of the Mth gate TCP and to the common electrode through the first contact hole at a predetermined end portion;

forming a second contact hole at an outer lower end portion of the image display part and electrically connecting the first common voltage supply line and the common electrode; and providing a color filter substrate corresponding to and attached to the array substrate.

11. The panel of claim 10, further comprising:

forming a data line number display part between the image display part and the first common voltage supply line.

12. The panel of claim 11, further comprising:

extending the first common voltage supply line to the image display part of the array substrate to include the data line number display part.

13. The panel of claim 12, further comprising:

forming the data line number display part in an intagliated form by patterning a gate metallic material.

14. The panel of claim 10, further comprising:

electrically connecting a second common voltage supply line to the common electrode through the first contact hole of the predetermined lower end portion via a signal line of the Nth data Tape Carrier Package.

15. The panel of claim 10, further comprising:

providing that the signal line electrically connected to the common electrode receive the common voltage from the data Tape Carrier Package or from the gate Tape Carrier Package.

16. The panel of claim 10, wherein the pixel electrode and the common electrode are made of ITO (Indium-Tin-Oxide), IZO (Indium-Zinc-Oxide) or ITZO (Indium-Tin-Zinc-Oxide).

17. The panel of claim 10, further comprising:

locating the second contact hole on the first common voltage supply line along the first common voltage supply line.

18. The panel of claim 10, further comprising:

locating the first and second common voltage supply lines in the gate line direction and in the data line direction, respectively, in the form of a patterned a gate metallic material.

* * * * *